United States Patent
Appleyard

(10) Patent No.: US 6,314,829 B1
(45) Date of Patent: Nov. 13, 2001

(54) STEERING ASSEMBLIES

(75) Inventor: Michael Appleyard, Lancashire (GB)

(73) Assignee: TRW LucasVarity Electric Steering Ltd., West Midlands (GB)

(*) Notice: Subject to any disclaimer, the term of this patent is extended or adjusted under 35 U.S.C. 154(b) by 0 days.

(21) Appl. No.: 09/367,746
(22) PCT Filed: Mar. 6, 1998
(86) PCT No.: PCT/GB98/00687
§ 371 Date: Aug. 19, 1999
§ 102(e) Date: Aug. 19, 1999
(87) PCT Pub. No.: WO98/39195
PCT Pub. Date: Sep. 11, 1998

(30) Foreign Application Priority Data

Mar. 7, 1997 (GB) .................................................. 9704808

(51) Int. Cl.[7] .................................. B62D 1/18; B62D 5/04
(52) U.S. Cl. .......................... 74/493; 74/492; 74/388 PS; 280/775; 280/779
(58) Field of Search ............................. 74/493, 496, 498, 74/388 PS; 280/775, 779

(56) References Cited

U.S. PATENT DOCUMENTS

| 4,774,851 | 10/1988 | Iwanami et al. |  |
|---|---|---|---|
| 5,090,730 | * 2/1992 | DeRoucher et al. | 74/493 |
| 5,498,032 | * 3/1996 | Thomas | 74/493 |
| 6,044,723 | * 4/2000 | Eda et al. | 74/388 PS |

FOREIGN PATENT DOCUMENTS

| 2226285 | 6/1990 | (GB) . |
| 2-102807 | * 4/1990 | (JP) . |

OTHER PUBLICATIONS

XP 000635471 548/Research Disclosure, "Column Mounted Electric Power Steering Rake and Telescope Steering Column Assembly".

* cited by examiner

Primary Examiner—David A. Bucci
Assistant Examiner—William C Joyce
(74) Attorney, Agent, or Firm—Tarolli, Sundheim, Covell, Tummino & Szabo L.L.P.

(57) ABSTRACT

A steering column assembly comprises an adjustable steering column (1) adapted to pivot about a point along its length relative to a mounting bracket (6). The steering column assembly also includes a gearbox adapted to transfer torque generated by an electric motor to the steering column (1). A spring (9), between the steering column (1) and the bracket (6), applies a twisting force sufficient to take up any radial play at the pivot. The spring (9) may be offset radially from the axis of the pivot in a direction parallel to the steering column axis as well as laterally offset from the axis of the steering column (1). An advantage is that the spring (9) eliminates vibration in the steering column (1) due to reaction torque from the electric motor, and can also act as a counter-balance to the weight of the electric motor.

12 Claims, 2 Drawing Sheets

STEERING ASSEMBLIES

FIELD OF THE INVENTION

This invention relates to column-mounted electrically actuated steering assemblies for vehicles and in particular, to assemblies of the kind in which the column is adapted to tilt about a pivot relative to the body of a vehicle so that the relative position of a steering wheel can be adjusted to meet the requirements of a driver.

BACKGROUND OF THE INVENTION

It is known to provide an electrically actuated steering assembly which employs an electric motor as a source of assistance torque for the driver. This is connected to a steering column via a gearbox. The electric motor, its associated drive and control circuit, and the gearbox, can be mounted upon the steering column shaft so that the shaft supports the weight of the assembly. The steering column and gearbox may form a single steering column assembly.

It is also known that the steering column can be fixed to the vehicle body by means of a substantially horizontal pivot which has its axis of rotation substantially perpendicular to the axis of the steering column shaft. The steering column can thus be tilted about the pivot so as simultaneously to enable height and rake adjustments of the steering wheel to be achieved. The use of such a simple pivoting steering column is well known in the art.

A problem arises when the use of a tiltable steering column is combined with an electrically actuated steering assembly. The motor applies an assistance torque to the steering column via the gearbox as required but, in doing so, generates a reaction torque which must be absorbed through the pivot into the vehicle body. Due to cost restraints during design, there is often a degree of free play in the pivot, and the effect of the reaction torque is to cause the steering column to move slightly about the pivot pin. This movement can produce unwanted noise and vibration in the steering column, for example whenever the torque of the motor varies.

One solution to the problem of reacting the torque generated by the motor would be the use of high precision bushings or by ensuring that there is no clearance at the pivot. However, this use of "over-engineering" to remove the symptoms of vibration does not effectively remove the source of the problem, and the problem would re-appear with wear of the pivot bushes.

SUMMARY OF THE INVENTION

According to our invention, in a steering apparatus comprising an adjustable steering column assembly adapted to pivot about a point along its length relative to a mounting bracket, said column assembly comprising at least a steering column and a gearbox fixed relative to said column, said gearbox being adapted to transfer a torque generated by an electric motor to said steering column, biasing means are provided between said steering column assembly and said mounting bracket, said biasing means being adapted to apply a twisting force between the mounting bracket and the steering assembly sufficient to take up any radial play in the pivot.

Most preferably, the twisting force (or torque) applied to the steering column assembly by the biasing means is greater than the maximum reactional twisting force which can be applied to the pivot due to operation of the motor. In this manner, the biasing force always exceeds the reaction force of the motor so that the free play in the pivot remains taken up under all conditions.

The biasing means may comprise a spring assembly which is attached to the steering assembly at a point laterally offset from the axis of the steering column about which the reaction torque is generated by the motor. The spring assembly may be attached to the gearbox. The spring assembly may comprise a single spring which exerts a torsional force on the pivot pin via the steering column assembly. The spring may be a helical spring.

In a modification, the biasing means may further be adapted to counter-balance all or at least part of the unbalanced weight of the steering column assembly, making it easier to adjust the height of the steering wheel. Preferably, this is achieved by providing a mounting point for the biasing means on the steering assembly which is offset radially from the axis of the pivot in a direction parallel to the steering column axis as well as being offset laterally from the axis of the steering column.

Preferably, the pivot comprises a pivot pin which is adapted to engage at each end with the mounting bracket and support the steering assembly by passing through a portion of the gearbox housing at a point around the center of the pivot pin. Alternatively, the pivot pin may comprise a spaced apart first and second pivot pins, with each pivot pin supporting the steering assembly on a respective side of the axis of the steering column assembly. The pivot pins may work in bushes in openings in the mounting.

A clamping device may also be adapted to be operable to fix the steering assembly in a predetermined position once adjustment of the angle of tilt has been made. The clamping device is preferably adapted so that the majority of the reaction torque is transferred to the mounting bracket through the pivot and not through the clamp due to the pivot means being comprised of very stiff components.

Therefore, by providing a biasing means, it is possible to overcome any undesirable vibration effects which may arise due to radial clearances present between the pivot pin(s) and the respective opening(s) or bushing(s) in the mounting bracket and steering column assembly.

BRIEF DESCRIPTION OF THE DRAWINGS

There will now be described, by way of example only, one embodiment of a steering assembly in accordance with the present invention, with reference to the accompanying drawings of which.

DETAILED DESCRIPTION OF THE INVENTION

Figure 1:
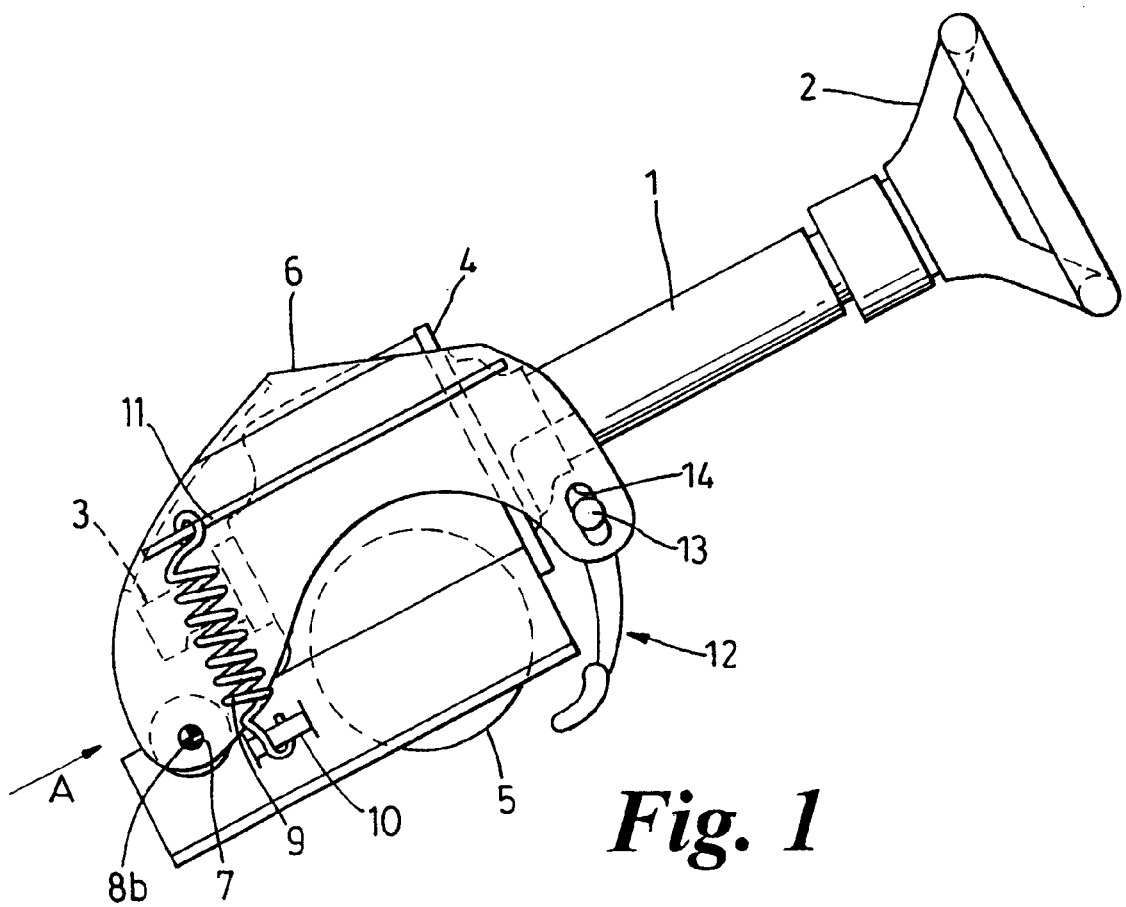
FIG. 1 is a view of a steering assembly in accordance with the present invention.
Figure 2:
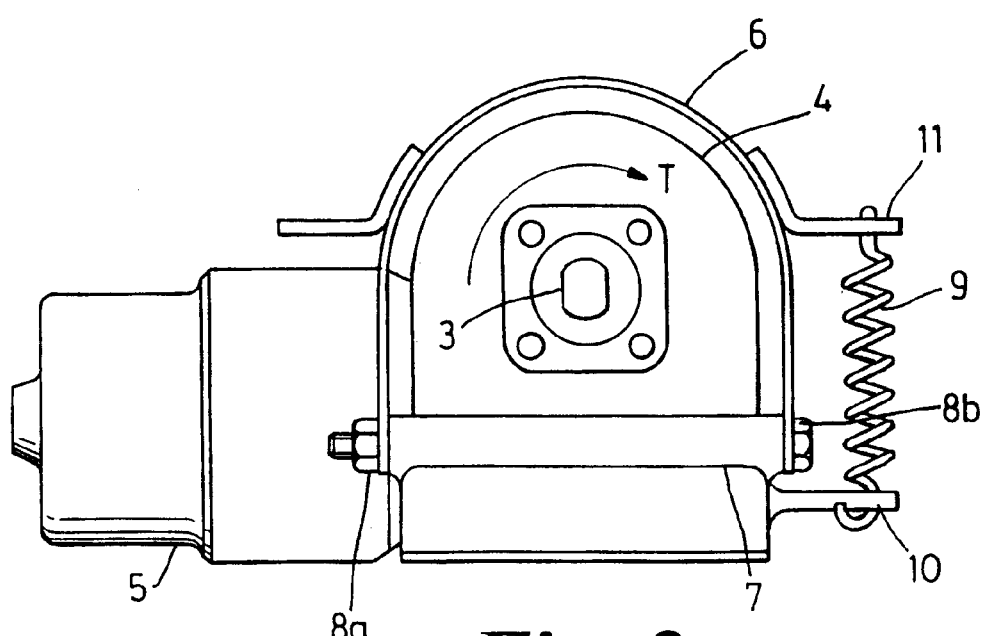
FIG. 2 is a view along the axis of the steering column in the direction A indicated in FIG. 1.

The steering column assembly illustrated in FIGS. 1 and 2 of the accompanying drawings comprises a steering column 1, a steering wheel 2 attached to a first end of the steering column 1, and a key 3 provided on the opposite end of the steering column which engages with a rack and pinion via an intermediate shaft (not shown). It will, however, be understood, that the steering column 1 is suitable for incorporation in any of the well known steering gear assemblies and is not limited to use with a rack and pinion.

The steering column 1 supports a casting 4 which in the example encases the electric motor, gearbox, torque sensor and electronic circuitry of an electric actuated steering system such as the kind disclosed in our British Patent application GB 9626298.5. The motor (not shown) protrudes from the casting 4 and is retained by a motor cover 5.

The whole assembly described above is mounted to a pressed metal or plastics mounting bracket 6 via a single pivot pin 7. The pivot pin 7 engages at its ends in the mounting bracket 6 via two holes 8a, 8b which are provided in the mounting bracket. The axis of the pivot pin 7 lies substantially orthogonal to the axis of the steering column 1 and is offset slightly so as to facilitate connection from the steering column 1 to the intermediate shaft (not shown) via the key 3.

When installed in a vehicle, the mounting bracket 6 is fixed so that the pivot pin 7 is substantially horizontal, allowing the column 1 to pivot in a vertical plane about the pivot pin 7. This enables the rake (or height) of the steering wheel 2 to be adjusted.

In order to retain the steering column at the desired inclination, a clamp or catch mechanism 12 is provided which comprises a latch means 13 which co-operates with a hole 14 in a portion of the mounting bracket 6. The latch means 13 can be released to allow pivotal movement of the steering column 1, or can be locked to prevent unwanted movement.

It will be apparent from FIG. 2 of the drawings that a torque applied to the steering column 1 by the electric motor produces a reaction torque T which must be transferred from the steering column assembly to the mounting via the pivot pin 7. However, if any radial play is present at the interface between the pivot pin 7 and the mounting holes 8a, 8b in the mounting bracket 6, the steering column can move radially about the pivot pin 7.

Furthermore, as seen in FIG. 1, the weight of the steering column and the electrically actuated steering assembly in the casting 4 is supported substantially by the pivot pin 7. Thus, it can prove difficult to move the steering column to the correct inclination due to the increased weight.

To overcome the problem of unwanted movement of the steering column assembly due to the reaction torque, a spring 9 is connected between a mounting lug 10 on the casting 4 and a mounting lug 11 on the mounting bracket 6. The spring 9 acts under tension to pull the casting 4 (and hence the whole steering column assembly) upwards towards the mounting bracket 6. This spring force, F, effectively provides a pre-load twisting force to the pivot pin 7 so that one end of the pivot pin 7 is forced upwards to take up any radial play between the pivot and the mounting hole 8b nearest the spring whilst at the same time rotating slightly about mounting hole 8a. This torsional pre-load helps to overcome any tendency for the assembly to move about the pivot pin 7 due to the torsional reaction force T generated by the motor. The spring 9 also takes up play between the pivot pin 7 and the casting 4.

The force F and position of the spring, 9, can be selected to satisfy two requirements. Firstly, the force and the position of the spring 9 can be chosen so that it exactly matches the unbalanced weight of the motor and/or the steering column to relieve the weight when the driver adjusts the column 1 or some desired properties of it. Secondly, the force and position of the spring 9 can be chosen so that a biasing force is applied to the pivot pin 7 which ensures that, even under maximum torsional load applied by the motor 2, the net twisting force applied to pivot pin 7 does not pass through the zero torque point i.e. spring applied torque minus reaction torque is greater than zero.

Figure 3:
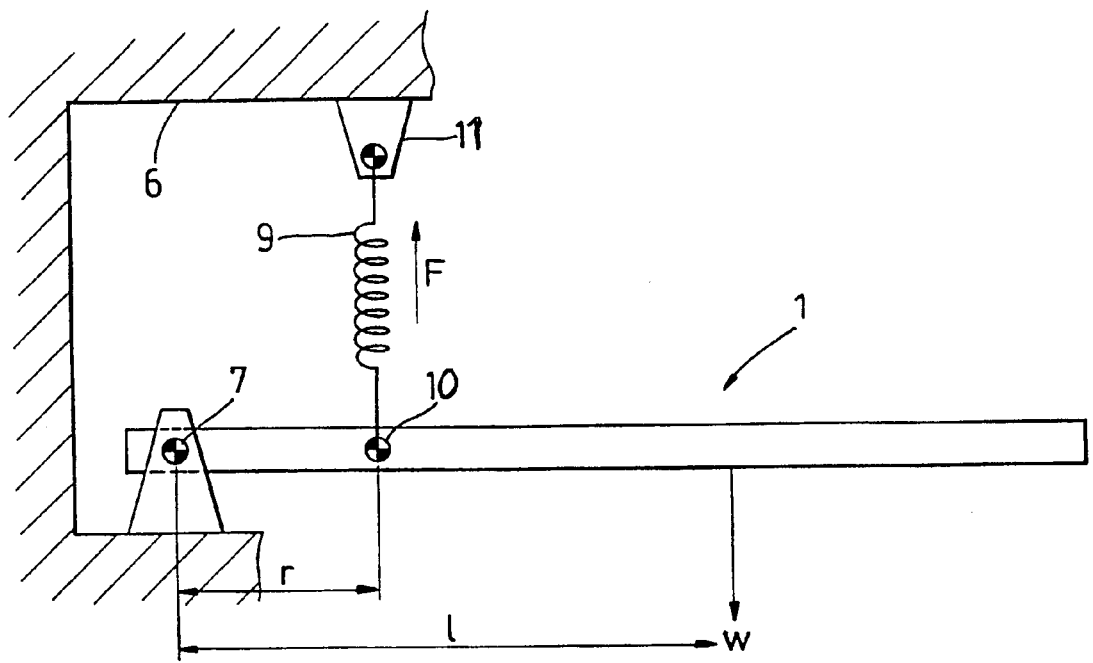
FIG. 3 is a force diagram equivalent to the view shown in FIG. 1.

To meet the first requirement, it can be shown, with reference to the force diagram of FIG. 3, that the spring force F must be substantially equal to:

$$F = \frac{(W \times l)}{r}$$

Where

F=Spring force,

W=unbalanced weight of the steering column l=radial distance from axis of pivot to center of gravity of steering column assembly including the steering wheel.

and r=the radial distance from the axis of the pivot to the point on the steering column assembly at which spring is located.

Figure 4:
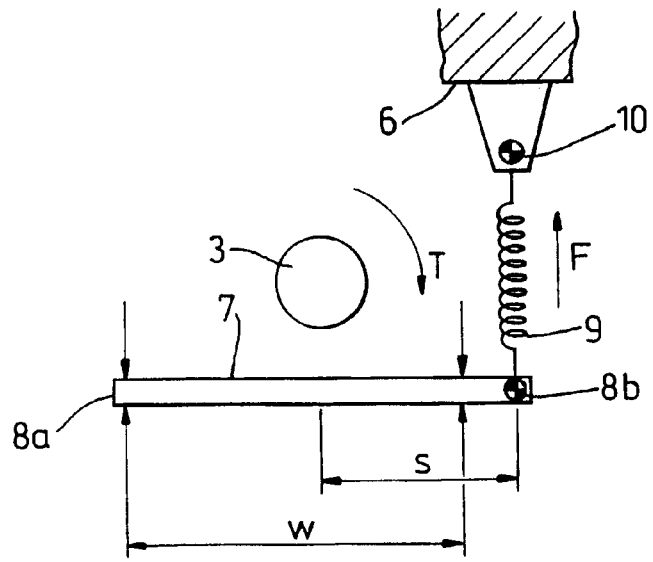
FIG. 4 is a second force diagram which corresponds to the view illustrated in FIG. 2.

To meet the second requirement, the spring force may satisfy the following equation as shown by FIG. 4:

$$F \geq \frac{T}{\left(s + \frac{w}{2}\right)}$$

Where

T=max. reaction torque of motor s=radial distance from axis about which reaction torque is produced to spring location on steering column assembly and w=spacing between points on pivot which engage the mounting bracket (i.e. approx. length of pivot pin).

The above equations are, however, only approximate, and depend on many factors such as the geometry of the system and frictional losses at the pivot. Also, the spring may only partially balance the weight of the steering column assembly if desired or alternatively provide an upwards bias.

Because the spring 9 permanently biases the pivot pin 7 in one direction to take up any radial play in the mountings at the end of the pivot adjacent the spring 9, even under full load of the motor, the end of the pivot pin 7 remains biased against the mounting hole and so "knock" under load (which is a result of vibration) is eliminated.

It will, however, be readily understood to the man skilled in the art, that the present invention lies in the application of a biasing force to the pivot pin to prevent vibration under load, and that it is not limited to the embodiments shown in the accompanying drawings. It will also be understood that the invention lies in a means for counterbalancing the weight of at least a part of the steering column assembly so as to make it easier to tilt the steering column.

As described, the biasing force can be provided by the use of a non-symmetrical twisting force generated along the axis of the pivot pin using a single spring acting in tension. It will also be understood that the biasing means could be arranged to act in compression whilst achieving the same effect.

It will be understood that the force produced by the biasing means will vary as the height of the steering wheel is adjusted, it being at its minimum when the steering wheel is at its highest position. The equation:

$$F \geq \frac{T}{\left(s + \frac{w}{2}\right)}$$

must still apply in this position for the invention to be fully effective. Practical biasing spring designs typically result in force variations of between 10% and 25%.

What is claimed is:

1. A steering apparatus comprising an adjustable steering column assembly adapted to rotate about a pivot at a point along its length relative to a mounting bracket, said adjustable steering column assembly comprising at least a steering column and a gearbox fixed relative to said column, said gearbox being adapted to transfer a torque generated by an electric motor to said steering column, wherein biasing means are provided between said steering column assembly and said mounting bracket, said biasing means being adapted to apply a twisting force between said mounting bracket and said steering column assembly sufficient to take up any radial play in said pivot, wherein said biasing means applies a twisting force to said steering column assembly which is greater than a maximum reactional twisting force which is applied to said pivot due to operation of said electric motor.

2. A steering apparatus according to claim 1 wherein said steering column has an axis about which said torque is generated by said electric motor and said biasing means comprises a spring assembly which is attached to said steering assembly at a point laterally offset from said axis of said steering column.

3. A steering apparatus according to claim 2 wherein said spring assembly is attached to said gearbox.

4. A steering apparatus according to claim 2 wherein said spring assembly comprises a single spring which exerts a torsional force about said pivot via said steering column assembly.

5. A steering apparatus according to claim 4 wherein said spring is a helical spring.

6. A steering apparatus according to claim 1 wherein said biasing means comprises a coil spring.

7. A steering apparatus according claim 1 wherein said steering column assembly has a weight which is unbalanced and said biasing means is further adapted to counter-balance at least said unbalanced weight of said steering column assembly.

8. A steering apparatus according to claim 7 wherein said steering column assembly has an axis, and a mounting point for said biasing means is provided on said steering column assembly, said mounting point being offset radially from an axis of the pivot as well as being offset laterally from said axis of said steering column assembly.

9. A steering apparatus according to claim 1 adapted to pivot about a pivot pin having a first end and a second end and a center portion between said ends and which is adapted to engage at each said end with said mounting bracket and support said steering assembly by passing through a portion of a housing of said gearbox at a point around said center portion of said pivot pin.

10. A steering apparatus according to claim 1 adapted to pivot about a spaced apart first pivot pin and a second pivot pin, with each pivot pin supporting said steering assembly on a respective side of an axis of said steering column assembly.

11. A steering apparatus according to claim 1 wherein a clamping device is provided which is adapted to be operable to fix said steering assembly in a predetermined position once adjustment of an angle of tilt of said steering column assembly relative to said mounting bracket has been made.

12. A steering apparatus according to claim 11 wherein said clamping device is adapted so that, in use, the majority of a reaction torque generated by said motor is transferred to said mounting bracket through said biasing means.

* * * * *